April 25, 1967        D. E. CAUGHRON        3,315,920
EMERGENCY LANDING APPARATUS FOR AIRCRAFT
Filed May 21, 1965
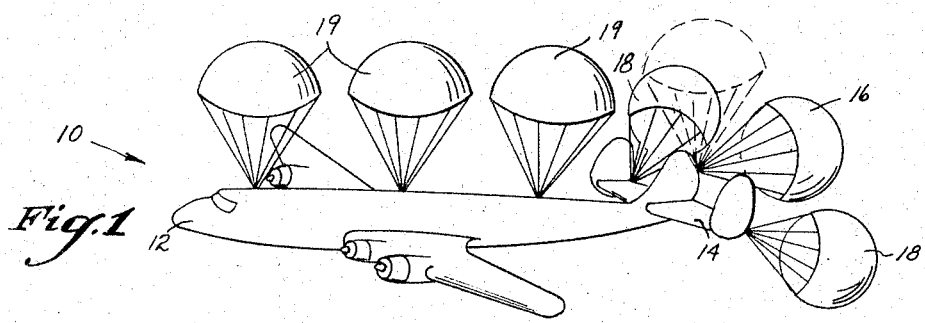
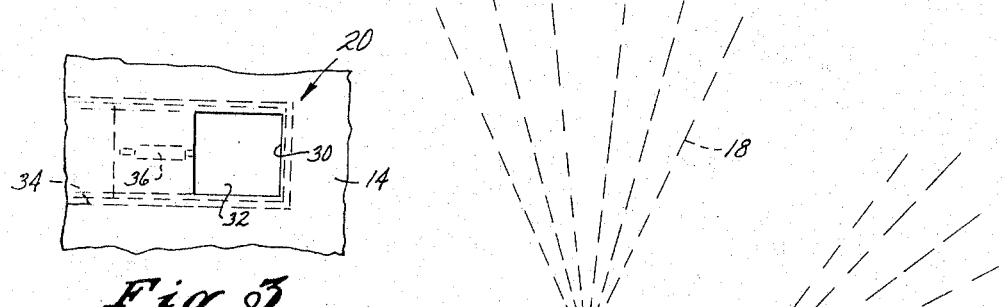
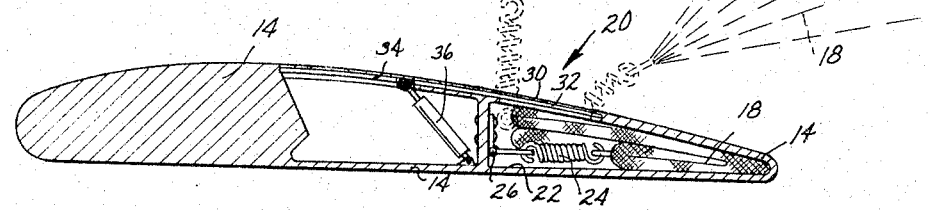
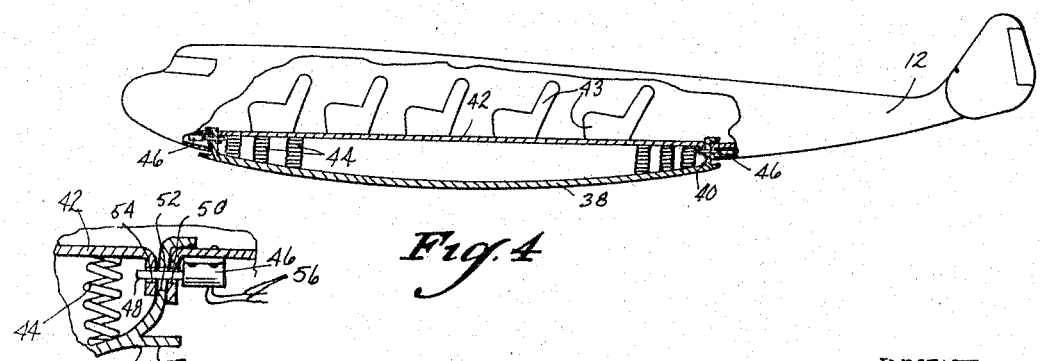
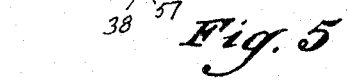
INVENTOR
Donald E. Caughron

United States Patent Office

3,315,920
Patented Apr. 25, 1967

3,315,920
EMERGENCY LANDING APPARATUS
FOR AIRCRAFT
Donald E. Caughron, 4702 Ridgedale,
Granite City, Ill. 62040
Filed May 21, 1965, Ser. No. 457,604
4 Claims. (Cl. 244—139)

This invention relates to aircraft and, more particularly, to an emergency landing apparatus therefor.

It is an object of the present invention to provide emergency landing apparatus for landing an aircraft in an emergency situation without motive power.

Another object of the present invention is to provide emergency landing apparatus for aircraft which includes a plurality of individually actuated parachutes carried by spaced apart portions of the fuselage and tail section for retarding forward motion of the aircraft and lowering the aircraft horizontally to the ground.

Another object of the present invention is to provide emergency landing apparatus for aircraft of the type described in which the fuselage is provided with a passenger compartment having a retractible fuselage section and depressible floor, maintained in spaced apart relationship with each other by means of compression coil springs, which will absorb a substantial amount of the impact forces transmitted to the passenger compartment upon impact of the fuselage with the ground.

Still another object of the present invention is to provide emergency landing apparatus of the aforementioned type which can be manually controlled by the pilot of the aircraft for sequentially releasing the parachutes when required and releasing the passenger compartment floor and fuselage section for cushioning upon impact.

All of the foregoing and still further objects and advantages of this invention will become apparent from a study of the following specification, taken in connection with the accompanying drawing, wherein:

FIGURE 1 is a perspective view of an aircraft having emergency landing apparatus made in accordance with the present invention, with the parachute units activated;

FIGURE 2 is an enlarged fragmentary cross sectional view of the tail section of the aircraft shown in FIGURE 1, illustrating the construction of an individual parachute compartment;

FIGURE 3 is a fragmentary top plan view of the apparatus shown in FIGURE 2, illustrating the compartment from which the parachute is released;

FIGURE 4 is a fragmentary side elevational view, with parts broken away, showing the fuselage section and passenger compartment floor for cushioning shock upon impact with the ground; and FIGURE 5 is an enlarged fragmentary cross sectional view illustrating the release mechanism for allowing relative movement between the floor and fuselage section relative to the fuselage of the aircraft upon impact with the ground.

Referring now to the drawing, an aircraft 10 having emergency landing apparatus made in accordance with the present invention, is shown to include a fuselage 12 and tail section 14. The tail section is provided with a central emergency parachute 16, and a pair of horizontally spaced apart parachute units 18. The upper portion of the fuselage 12 is provided with three longitudinally spaced apart parachute units 19.

Each parachute unit is individually housed within a special parachute release compartment 20, as is more clearly shown in FIGURES 2 and 3. Each parachute compartment 20 includes a compartment or well 22 in the fuselage or tail section portion, within which the parachute is stored in a folded position. The shroud lines of the parachute are connected to a tension coil spring 24, which is, in turn, pivotally connected to a fitting 26 within the well 22. Each compartment or well 22 is provided with an access opening 30, through which the parachute may be released and opened. Each such access opening 30 is normally closed by a sliding door 32 slidably mounted within a pair of longitudinal guide grooves 34, for longitudinal displacement by means of a hydraulic cylinder 36 pivotally mounted at opposite ends to the aircraft framework and the door 32. It will thus be recognized that upon actuation of the cylinder 36, the sliding door 32 is opened to enable the parachute to be released outwardly through the access opening 30 to perform its function.

Each of the cylinders 36 may be controlled, in any conventional manner, from a central location in the cockpit of the aircraft. Thus, as soon as there is a failure in motive power of the aircraft, the rear central chute 16 is released first, to bring the forward movement of the aircraft to a halt. While opening in a rearward direction, as shown in FIGURE 1, upon initial release, the chute 16 will assume a vertical position, as soon as the forward motion of the aircraft has been halted, after which the adjacent tail chutes 18 are released. As soon as the nose of the aircraft starts to descend, the fuselage chutes 19 are released, whereupon the six fully opened chutes will gently lower the aircraft toward the ground.

The fuselage 12 is also provided with a fuselage section 38, mounted within a belly well 40 for limited upward movement to the passenger compartment of the aircraft. The passenger compartment includes a floor section 42, upon which the seats 43 are secured, which is slidably mounted within the fuselage section 38. A plurality of compression coil springs 44 are mounted between the fuselage section 38 and the floor 42, thus yieldably resisting movement of such parts toward each other. A plurality of solenoids 46 mounted upon the fuselage 12, each have retractible plungers 48 that are slidably received within aligned openings 50, 52, 54 in abutting flanges of the fuselage 12, fuselage section 38, and floor 42, respectively, thus normally locking the fuselage section 38 and floor 42 in fixed relationship with the fuselage 12. However, upon energization of the solenoids 46, through suitable circuitry 56, the plungers 48 are retracted, so as to allow relative movement between the fuselage section 38 and floor 42, with respect to the fuselage 12. Thus, upon impact of the aircraft with the ground, the fuselage section 38 will at first be driven vertically upwardly with respect to the fuselage 12, such upward movement being limited by stop flanges 57 abutting with the depending flanges 58 of the fuselage 12, after which the floor 42 will be permitted to descend, cushioned by the springs 44, producing an overall shock absorbing effect upon the floor 42 to minimize shock to the passengers.

The solenoids 46 are connected to circuitry controllable in the cockpit of the aircraft. Thus, as the aircraft descends upon its chutes, the pilot may energize the solenoids 46 to release the floor and fuselage section for its cushioning action upon impact with the ground.

Thus, a complete emergency landing apparatus has been provided which can be readily installed in all types of commercial, military, and private aircraft.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. In an aircraft having a fuselage with a passenger compartment and a tail section, apparatus for landing the aircraft in an emergency comprising, in combination, a fuselage section mounted beneath said passenger compartment retractible upwardly into the passenger compartment, a floor carried by said fuselage section, compression spring means acting between said fuselage section and said floor yieldably maintaining said floor and fuselage section in spaced apart relationship, releasable lock means releasably securing said fuselage section and said floor in normal assembled relationship within said fuselage, and a plurality of parachute assemblies each including a parachute releasably stored within spaced apart portions of said fuselage and tail section for supporting said aircraft for controlled descent upon failure of motive power for landing upon said fuselage section in response to the release of said parachute assemblies and said lock means.

2. In an aircraft as set forth in claim 1, wherein said compression spring means comprises a plurality of compression coil springs yieldably acting between said floor and said fuselage section.

3. In an aircraft as set forth in claim 2, wherein said releasable lock means comprises a plurality of bolts slidably received through aligned portions of said fuselage, fuselage section, and said floor, and solenoid means for retracting said bolts to accommodate movement between said fuselage section and said floor relative to said fuselage.

4. In an aircraft as set forth in claim 3, wherein each said parachute assembly comprises a compartment formed in an upper surface of one of said fuselage and said tail sections, a parachute having shroud lines secured within said compartment, a slide cover retractibly carried by said compartment for actuating said parachute, and remote control means for retracting said slide cover.

References Cited by the Examiner
UNITED STATES PATENTS

| | | | |
|---|---|---|---|
| 1,715,742 | 6/1929 | Doucett | 244—139 X |
| 3,107,887 | 10/1963 | Dixson et al. | 244—139 |
| 3,129,909 | 4/1964 | Smith | 244—139 X |

MILTON BUCHLER, *Primary Examiner.*

ALFRED E. CORRIGAN, *Examiner.*